United States Patent [19]

Charet et al.

[11] Patent Number: 5,190,801
[45] Date of Patent: Mar. 2, 1993

[54] DUAL WIPER EXTRUSION

[75] Inventors: Pierre Charet; Govelio R. Gonzalez, both of Miami, Fla.; John M. White, Dumfries, Va.

[73] Assignee: Rally Accessories, Inc., Miami, Fla.

[21] Appl. No.: 631,939

[22] Filed: Dec. 21, 1990

[51] Int. Cl.[5] .............................. B32B 3/06; B605 1/40
[52] U.S. Cl. ...................................... 428/99; 428/122; 428/358; 15/250.41; 15/250.42
[58] Field of Search ........... 15/250.41, 250.42, 250.36; 428/122, 99, 100, 358

[56] References Cited

U.S. PATENT DOCUMENTS 4,339,839 7/1982 Knights ............................ 15/250.42

FOREIGN PATENT DOCUMENTS 327233 8/1989 European Pat. Off. ......... 15/250.36

Primary Examiner—Alexander S. Thomas
Attorney, Agent, or Firm—Longacre & White

[57] ABSTRACT

A dual wiper extrusion including a pair of U-shaped squeegee support channels. Each channel includes an L-shaped extension to connect the extrusion to a wiper support assembly. The respective channels are smoothly contoured and joined one to the other by a bridging member located between the top and bottom limits of the extrusion to reduce cracking and failure of the extrusion during installation.

1 Claim, 1 Drawing Sheet

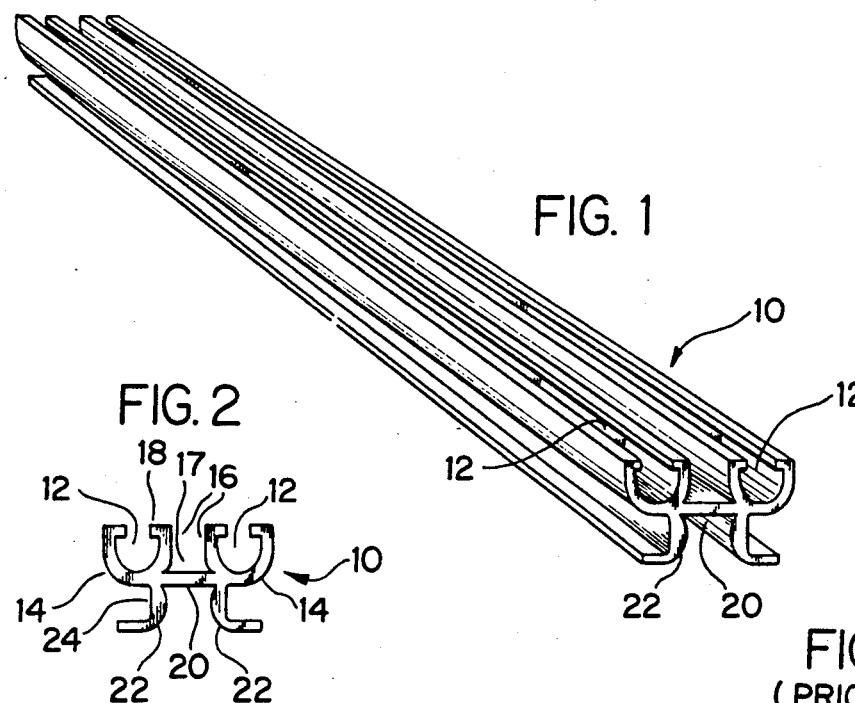
FIG. 1
FIG. 2
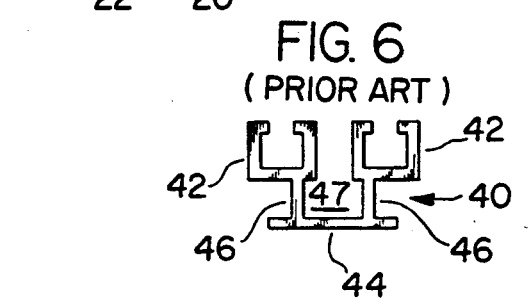
FIG. 6 (PRIOR ART)
FIG. 3
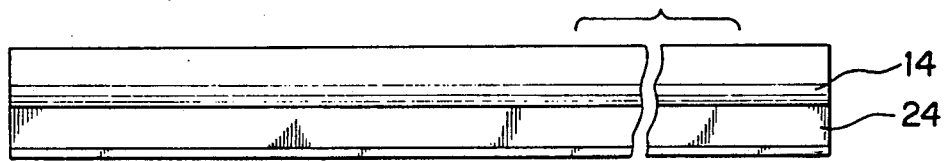
FIG. 4
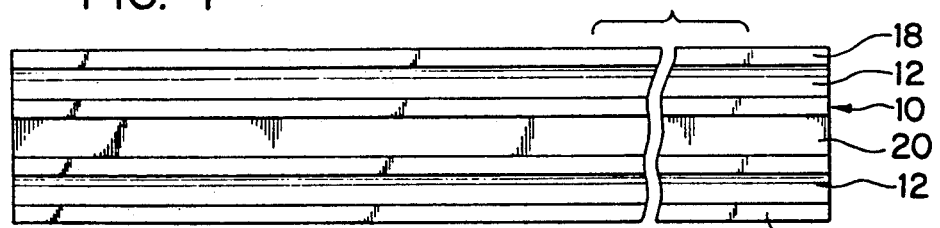
FIG. 5
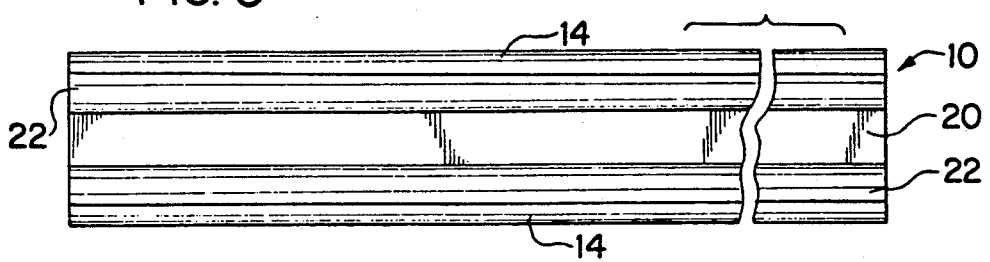

DUAL WIPER EXTRUSION

BACKGROUND OF THE INVENTION a. Field of the Invention

The present invention relates to the field of wiper extrusions, and more particularly relates to the field of dual wiper refill type extrusions. This invention relates to an improved extrusion the shape of which is less inclined to stress concentration related fractures and is a generally more compact and stiff extrusion.

b. Description of the Prior Art

The prior art includes several dual edge wiper extrusion pieces. The extrusion is usually combined with two or more squeegee wiping elements and further includes a brush or other type of surface clearing implement. A recently available prior art dual edge wiper extrusion is disclosed in U.S. Pat. No. D 304,709 to Sussich, shown in FIG. 6 herein. This wiper extrusion 40 is characterized by a squared off profile for the respective squeegee holding channels 42. Each channel 42 includes a right angle extension member 46 for attaching the extrusion to wiper assembly support elements. Each of the separate channels 42 and extension members 46 are attached one to the other by a bridging piece 44 extending between the channels along an upper edge of the extrusion. The location of the bridging piece 44 creates a full height channel 47 between the respective elements 42

Owing to the generally right angled profile of the Sussich extrusion and the edge positioned location of the bridging member 44, bending and flexing stresses induced during the mounting sequence to place the extrusion on a wiper assembly, i.e., trimming the extrusion to length and manipulating the extrusion to insert the end into successive wiper assembly supports, can cause the extrusion to crack along one or the other side of the bridging piece 44. Such cracking renders the extrusion useless since it no longer fits tightly within the wiper support arms and the squeegee holding elements 42 become separate articles.

Accordingly the extrusion according to the present invention eliminates the stress concentrations of prior art right angled extrusion, and relocates the bridging piece between the squeegee support channels to a central position between the channels creating a stiffer and more compact extrusion profile.

SUMMARY OF THE INVENTION

The extrusion according to the present invention includes a pair of U-shaped channels for holding wiper squeegee elements. The U-shaped channels have a smooth arcuate profile. Each channel shape includes an extending L shape for adjoining to one side of a supporting wiper assembly. Each L-shape is formed from a smooth arc of material to eliminate stress concentrations. The separate channels with extending L-shapes are joined by a centrally located bridging piece. In this manner, a stiff, resilient, and fracture resistant dual edge wiper extrusion is created.

The following is a description of the preferred embodiment of the present invention including claims and drawings which form a part thereof.

BRIEF DESCRIPTION OF THE DRAWINGS

FIG. 1 is a perspective view of a wiper extrusion according to the present invention.

FIG. 2 is an end view of the wiper extrusion shown in FIG. 1.

FIG. 3 is a side elevational view of the wiper extrusion shown in FIG. 1.

FIG. 4 is a bottom plan view of the wiper extrusion shown in FIG. 1.

FIG. 5 is a top plan view of the wiper extrusion shown in FIG. 1.

FIG. 6 is an end view of a prior art dual wiper extrusion.

DETAILED DESCRIPTION OF THE PREFERRED EMBODIMENT

The wiper extrusion according to the present invention 10 includes a pair of squeegee holders 14 each including an extension member 22 for attaching the extrusion to a wiper assembly. The separate holders 14 are connected one to the other by a centrally located bridging piece 20. Each of the squeegee holders 14 and extension members 22 are preferably formed of smooth arcuate sections, including channel inner wall 16, so as to reduce stress concentrations at bends in the shape.

Each of the squeegee holders forms a channel 12 for securing a wiper refill, each channel being subtended by end caps 18 to prevent the squeegee member from becoming dislodged from channel 12.

Each extension member 22 forms a channel 24 for slidably interfitting with a wiper support assembly. The channels 24 inner shape and size being determined by the shape and size of a respective wiper support assembly.

Owing to the centrally positioned bridging element 20, the wiper extrusion 10 includes only a half height channel 17 existing between the squeegee channels 14. As a result, installation manipulation and trimming of the extrusion shape according to the present invention cannot create the same amount of deformation and resultant stress at the joints between the bridging member 20 and the respective squeegee support channels 14 as exists in the prior art extrusion wherein the bridging member is at one edge of the extrusion.

The wiper extrusion according to the present invention is preferably made from a resilient extrudable plastic or vinyl. The extrusion can also be made from a light gauge metal, depending on the durability requirements of the wiper.

The foregoing description is intended as an enabling disclosure for a person of ordinary skill in the windshield wiper art, and is not intended to limit the invention in terms of obvious modifications to the invention in light of this disclosure.

What is claimed is:

1. A dual wiper extrusion comprising:
   a pair of smoothly arcuate U-shaped channel members positioned parallel one to the other and opening in the same direction and defining a plurality of bottom end caps, each U-shaped member including a smoothly arcuate L-shaped extension from a back side of said U-shaped member opposite said end caps, said respective L-shaped extension from each U-shaped member forming opposed channels for connecting said extrusion to a wiper assembly, said U-shaped channel members and said L-shaped extensions being formed in said smoothly arcuate form so as to eliminate stress concentrations at all physical locations along said members and extensions, said U-shaped channel members connected one to the other by a single, continuous bridging member joined to each respective U-shaped member at a location on said U-shaped members located between said end caps and said back side extension of said L-shaped extensions whereby bending stress induced in said bridging member from the twisting action of said extrusion in use and during installation of said extrusion is minimized to substantially eliminate splitting of said extrusion in or along said bridging member.

* * * * *